United States Patent
Piponi (10) Patent No.: US 6,990,230 B2
(45) Date of Patent: Jan. 24, 2006

(54) REVERSE-RENDERING METHOD FOR DIGITAL MODELING

(75) Inventor: Daniele Paolo David Piponi, Oakland, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 49 days.

(21) Appl. No.: 10/715,869

(22) Filed: Nov. 17, 2003

(65) Prior Publication Data

US 2004/0146197 A1 Jul. 29, 2004

Related U.S. Application Data

(60) Provisional application No. 60/426,560, filed on Nov. 15, 2002.

(51) Int. Cl.
*G06K 9/00* (2006.01)

(52) U.S. Cl. .................. 382/154; 345/419; 382/285

(58) Field of Classification Search ............... 382/103, 382/107, 113, 154, 285, 293; 345/419
See application file for complete search history.

(56) References Cited

U.S. PATENT DOCUMENTS

| | | | |
|---|---|---|---|
| 5,499,306 A | | 3/1996 | Sasaki et al. |
| 5,600,763 A | * | 2/1997 | Greene et al. ............. 345/420 |
| 5,821,943 A | | 10/1998 | Shashua |
| 6,052,124 A | | 4/2000 | Stein et al. |
| 6,137,491 A | | 10/2000 | Szeliski |
| 6,271,855 B1 | | 8/2001 | Shum et al. |
| 6,278,460 B1 | | 8/2001 | Myers et al. |
| 6,310,644 B1 | | 10/2001 | Keightley |
| 6,333,749 B1 | | 12/2001 | Reinhardt et al. |
| 6,373,487 B1 | | 4/2002 | Culbertson et al. |
| 6,483,514 B1 | | 11/2002 | Duff |
| 6,571,024 B1 | | 5/2003 | Sawhney et al. |
| 6,765,574 B1 | * | 7/2004 | Mao et al. ................. 345/428 |

OTHER PUBLICATIONS

Frank Dellaert, "Monte Carlo EM for Data-Association and its Applications in Computer Vision", Sep. 21, 2001, CMU-CS-01-153, School of Computer Science, Carnegie Mellon University.*

"Monte Carlo EM for Data-Association and its Applications in Computer Vision" by Frank Dellaert, School of Computer Science; Carnegie Mellon University, Pittsburg, PA 15213; CMU-CS-01-153; Sep. 21, 2001.

"Bundle Adjustment—A Modern Synthesis" by Bill Trigg et al., INRIA Rhine-Alpes, 655 avenue de L'Europe, 38330 Montbonnot, France; (pp. 1-71).

(Continued)

*Primary Examiner*—Jose L. Couso
*Assistant Examiner*—Tom Y. Lu
(74) *Attorney, Agent, or Firm*—O'Melveny & Myers LLP (57) ABSTRACT

A method for automatically or semi-automatically constructing a digital 3D model of a scene from photographic data and photogrammetry data includes defining an initial rough model as a solution estimate. A reverse rendering step includes a second-order solution method that employs automatic differentiation techniques to accurately compute derivatives of an error function. In an embodiment of the method, at least one camera is placed within the scene being constructed, and photographic data from this camera is used in the solution process.

17 Claims, 1 Drawing Sheet

OTHER PUBLICATIONS

"Automatic Differentiation: Obtaining Fast and Reliable Derivatives—Fast" by Christian H. Bischof, Alan Carle, Peyvand M. Khademi and Gordon Pusch, Argonne Preprint MCS-P484-1194; Also to appear in Proc. of the SIAM Symposium on Control Problems in Industry San Diego, Jul. 1994; (pp. 1-17).

"A Collection of Automatic Differentiation Tools", http://www-unix.mcs.anl.gov/autodiff/AD_Tools.

"On Automatic Differentiation" by Andreas Griewank, Argonne National Laboratory; Mathematics and Computer Science Division, Preprint ANL/MCS-P-10-1088; Nov. 1988.

* cited by examiner

REVERSE-RENDERING METHOD FOR DIGITAL MODELING

CROSS-REFERENCE TO RELATED APPLICATION

This application claims priority pursuant to 35 U.S.C. § 119(e) to U.S. Provisional Application No. 60/426,560, filed Nov. 15, 2002, which application is specifically incorporated herein, in its entirety, by reference.

BACKGROUND OF THE INVENTION

1. Field of the Invention

The present invention relates to methods in the field of digital imaging, and more particularly, to reverse rendering method, such as photogrammetry and match-moving, for digital modeling.

2. Description of Related Art

In recent decades, computers have increasingly been used to generate and/or modify moving images for virtually every application that makes use of them, for example, television and motion pictures, computer games, and engineering model building. It is believed that use of digital modeling will become much more widespread in the future. Reverse-rendering methods—i.e., methods for determining what geometric, motion, lighting, camera, and other input will result in a desired image or image sequence—are likely to play an important role in developing digital models for a variety of applications.

For example, one of the problems encountered in digital modeling involves the use of photogrammetry to build three-dimensional ("3-D") models using two-dimensional ("2-D") photographic data. Match-moving methods extend photogrammetry to the modeling of movement over a sequence of images. Current photogrammetry and match-moving methods are difficult to implement in a flexible manner. Consequently, prior-art applications generally place undesirable constraints on acceptable input data, in order to keep complexity and programming requirements at a manageable level. For example, many prior art methods do not permit a user to specify arbitrary expressions for defining relationships between parameters of a scene graph. In addition, prior-art methods do not allow placement of the camera anywhere in the scene graph. Present methods may also sometimes become locked in a computational loop or arrive at an incorrect solution, thereby failing construct useful 3-D models from the available 2-D data at all. It is therefore desirable to provide an improved method for constructing 3-D digital models from 2-D photographic data, that overcomes the limitations of prior-art photogrammetry techniques.

Photogrammetry, match-moving, and other reverse-rendering methods may be viewed as applications for differential calculus. Differential calculus has many applications in digital movie production. For example, its applications include rendering (anti-aliasing, motion-blurring), animation (inverse-kinematics, match-moving), modeling (determination of normals, photogrammetry), simulation (implicit integration of equations of motion), and other miscellaneous applications (lens and color calibration, optical flow estimation, and others). Traditionally, differential calculus is applied to such problems by writing software to compute derivatives of functions and approximations of derivatives, such as by deriving expressions by manual analysis and implementing these as expressions in software code, by post-processing, or using finite differences.

Each of these traditional methods is subject to various limitations. Differentiating code by hand is a tedious and error-prone process, and generally makes code more difficult to modify. Post-processing of source code to automatically generate coded differential expressions complicates the programming process and constrains coding styles. Finite difference methods, which calculate an approximation of a differential using a finite difference δ, may not be sufficiently accurate. With these methods, there is some difficulty associated with selecting a proper value for δ. Too large, and the approximation will be poor. Too small, and the result may be dominated by rounding errors.

However, there is another technique: automatic differentiation. Despite extensive use of differential calculus, automatic differentiation is not well known in the digital imaging art, although some scattered references exist. It is further desirable to apply automatic differentiation to the solution of various differential calculus problems in digital imaging, for photogrammetry and other applications in a way that increases computational speed and/or lowers programming costs.

SUMMARY OF THE INVENTION

The present invention provides an improved reverse-rendering method, that overcomes the imitations of the prior art. The invention further provides a method for solving photogrammetry problems, and similar problems that use differential calculus, using generically-coded software. Methods according to the invention have been recently applied in the production of feature films, and may readily be extended to related applications for digital imaging.

The following paragraphs summarize exemplary steps of a method according to the invention. Initially, images (which may include still photographic images, video or motion pictures) are taken of a scene from multiple camera positions. The images may be provided in digital form and stored in a database to be accessed during later steps of the method. Cameras may be positioned within the scene itself. Position, focal length, and orientation of the cameras may be noted for later use; however, such information need not be highly accurate. A user may collect the camera data, and inspect representative images to gain an initial impression of the scene.

Optionally, a user may construct a rough three-dimensional model of the scene as an initial estimate. Any suitable modeling software, such as Maya™, may be used. In the alternative, any other suitable method for defining a starting assumption for the solution process may be used. This may further speed the solution process and/or prevent incorrect solutions. Relationships between modeled objects in the scene may be defined by intervening transforms in a scene graph.

The scene graph may include selected viewable objects in the scene and known camera data for at least those cameras positioned in the scene itself. Any desired transforms between nodes in the scene graph that are consistent with the photographs may also be defined as part of the scene graph. Not all objects in the scene need be included in the scene graph, and not every transform need be defined. A scene graph may be particularly useful when the nature of the photographs are such that subsequent photogrammetry steps have difficulty arriving at a correct solution, for example, when several possibilities are apparent for the shape of an object, all of which conform to the photographs. Software tools for creating scene 3D scene graphs are known in the art.

A user should also designate the images that are to be used as inputs for the photogrammetry solver, and identify corresponding points or other features on the designated images. A user interface may be provided to assist a user in designating common points on related images. The designated images, the identified corresponding points on the images, the scene graph, and any related 3D models, may be designated as input to a photogrammetry solver. Initial information that is not defined by the scene graph or modeled objects may be defined in any suitable fashion to an arbitrary, interpolated, or estimated value. The initial visual coordinates and camera parameters represent a baseline for an error function, such as a least-squares function and/or any other suitable error function.

The principles of photogrammetry may then be applied, using the corresponding points identified in the photographs and/or other selected points or features to determine an amount of difference, i.e., error, between the initial estimate of the scene (including both geometry and camera parameters), and a scene calculated by projecting the selected points on the photographs based on the camera parameters. For example, a point "A1" may have actual spatial coordinates $\bar{u}_1$ in the defined coordinate system. A corresponding point "A2" may have coordinates $\bar{u}_2$, representing an estimated position for A1. The estimate A2 is based on an intersection of rays passing through an assumed point A1 in the photographic plane, as determined from each photograph and its corresponding camera parameters. The difference $\bar{e} = \bar{u}_1 - \bar{u}_2$ is the error for point A1. This is repeated for multiple points to define an least-squares error e as a function of all the unknown parameters of interest. Techniques for defining the error are known in the art.

The error function may be minimized using any suitable error minimization method. Minimization software typically computes the sum of the squares of the error (or sometimes an alternative to the square in "robust" methods) and then tries to find the solution that minimizes the error through an iterative process. The iterative process of adjusting the "bundles" of rays used to define the three-dimensional geometry of the scene by minimizing an error function is sometimes referred to as "bundle adjustment" by those of ordinary skill in the art.

In the present method, when the user builds the scene graph, some parameters may be marked as parameters that the photogrammetry tool is required to solve for. For example, such parameters may include camera focal length, relative object scales and rotation angles. Other parameters may be established as constant values throughout the bundle adjustment process. The error measure e generally varies as a function of the unknown parameters, and a certain set of parameter values will minimize error.

The invention permits one or more unknown parameters to be related to one or more other unknown parameters using an arbitrary expression. For example, if "a" and "b" represent scale factors for respective objects in the scene, and it is known that a first one of the objects is twice as large as a second one, this may be expressed symbolically by "a=2b." These further relationships may be freely incorporated into the error function. Unlike prior-art bundle adjustment methods, such changes may be freely incorporated into the error function.

Bundle adjustment may proceed using a second-order Newton method that includes a computation of both the first derivative of the error function (its "Jacobian") and the second derivative (its "Hessian"). Second-order error minimization in this context is described, for example, in *Bundle adjustment—a Modern Synthesis*, Triggs, et. al., 2000. However, prior-art methods make use of a Gauss-Newtonian approximation and do not compute the full second derivative. Traditionally, accurate calculation of the second derivative is considered to be computationally complex, and so modified Newton methods, such as the Jacobian-based version of the Levenberq-Marquardt methods, are used to avoid this complexity.

According to the present invention, however, both the first derivative (Jacobian) and the second derivative (Hessian) of the error function may be accurately computed using the technique of automatic differentiation. Principles and applications for automatic differentiation are known in other contexts, as published, for example, in *On Automatic Differentiation* by Andreas Griewank, Argonne National Laboratory, Mathematics and Computer Science Division, preprint ANL/MCS-P10-1088 (November 1988), which is incorporated herein by reference. The techniques of automatic differentiation may be adapted to calculate the Jacobian and Hessian matrices by one of ordinary skill, with reference to the disclosure herein or to other published references on automatic differentiation. Automatic differentiation may also be used to compute the Jacobian without computing the full Hessian.

A solution of the error function is thereby realized much more quickly than using traditional methods, while using software that is comparatively efficient to program, to modify, and to add new features to. In contrast, programming for prior-art photogrammetry methods is comparatively expensive, time-consuming, and difficult to modify. The full benefit of Newton's method can be realized, with rapid convergence to the error minimum, while computation of the derivatives is also accomplished quickly. Advantageously, placing one or more of the cameras arbitrarily within the scene graph does not cause any difficulties when the solution technique of the invention is used. This advantage, in turn, makes it much more convenient to gather photographic images for photogrammetry, and may even enable application of photogrammetry to scenes that were heretofore difficult or impossible to adequately reconstruct from images. In contrast, prior-art photogrammetry methods have not permitted much or any flexibility in the placement of cameras within the scene to be reconstructed, to the extent that such placement was permitted at all.

Unlike prior-art bundle-adjustment methods, automatic differentiation implemented in a generic programming scheme is preferably used to compute an accurate first and/or second derivative of the error function, thereby guiding the bundle adjustment to a solution. In addition, the bundle adjustment is guided by the partial information contained in the scene graph, thereby reducing the solution time and ensuring a more accurate result. An additional advantage is that an algorithm according to the invention is much simpler to implement in source code than both the traditional Jacobian-based Levenberg-Marquardt method, and algebraic derivative methods. In addition to these advantages, the use of automatic differentiation according to the invention provides the further advantage of flexibly accommodating almost any initial scene graph. This is a key advantage because it frees the person constructing the scene from defining the initial scene graph in any particular manner. Corrections and changes are also readily accommodated.

As an example of the flexibility afforded by the invention, any node of the scene graph can be connected to any other via a mathematical expression entered by a user. Almost any expression may be used. For example, the height of an object may be designated to be a scalar multiple of any other object. For further example, the focal length of two cameras may be equated or otherwise related. Almost any desired relationship between nodes that can be expressed mathematically may be entered as part of the scene graph. Even unusual relationships, for example, a relationship between the size of an object and an angle between two other objects, may be included.

A further advantage of the invention is the treatment of cameras. In a scene graph, camera data is represented at nodes, just as data for viewable objects. Cameras can be placed in the scene graph in the same kinds of relationships as other objects. At the same time, a solution algorithm according to the invention is configured to simultaneously compute the scene geometry and the camera pose. This approach permits, unlike prior-art methods, posing a camera freely within the scene itself. In this context, "freely posing" means that the camera may be posed at any desired location within the scene, without limitations imposed by a defined solution algorithm. For example, a first camera may be pointed at a freeway as a car travels past, and a second camera may be mounted on the car. Notably, the second camera may be mounted on an actual scene object—the car—that is being solved for. This may be a great advantage for those situations in which the camera position and orientation depend on the geometry that is being solved for. For example, cameras may be placed in the scene on top of buildings of unknown height, obviating the need for a fly-over or for elevated vantage points external to the scene.

In an embodiment of the invention, the scene to be reconstructed by photogrammetry is represented as a scene graph, which is a type of directed acylic graph, or "DAG." Scene graphs are generally not used in connection with photogrammetry for the post-production industry. Instead, in prior-art photogrammetry methods, the scene is typically represented by a collection of unrelated points. Parent/child relationships and transforms are not defined, unlike scene graphs. To the extent that the use of initial scene graphs containing partially-defined information as a precursor to a photogrammetry solution has been known at all, the ability to freely define transforms in an essentially unrestricted way is not known. Using these partial transform relationships, which are flexibly defined by the user, allows for much more accurate reconstructions and for reconstructions using far fewer images.

It should be apparent that the invention is not limited to static photogrammetry. With the addition of a time coordinate, the invention may readily be adapted to account for camera motion, or the motion of objects in the scene, according to principles understood in the art. For example a sequence of five-hundred frames of film can be treated as five-hundred independent images, which are then solved for in the usual way. Some parameters may vary from frame to frame (e.g. the position of a moving camera), while others (e.g. the height of a house) may remain constant. Hence, the invention may readily be used for solving match-moving problems.

A more complete understanding of the methods according to the present invention will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENTS

The present invention may be considered to have several different aspects that overcome the limitations of the prior art. For example, one aspect may comprise a method for solving bundle adjustment problems, and similar problems that use differential calculus, using generically-coded software for automatic differentiation. Another aspect may comprise an improved photogrammetry method that is designed to exploit the benefits of automatic differentiation. In the detailed description that follows, the analytical basis for the application of automatic differentiation to differential calculus problems in digital imaging is first described. Then, application of automatic differentiation using a generic programming approach is described in a second section. A third section provides a description of an exemplary photogrammetry process that may make use of automatic differentiation and generic programming as disclosed herein.

I. Automatic Differentiation

The invention provide a method for computing derivatives of a function using a programming language, such as C++, that supports the introduction of new types and operator overloading. The method is relatively easy to program without requiring a well-developed knowledge of differential calculus, does not require post-processing of source code, and is both more efficient, and more accurate than finite difference methods. The method makes use of automatic differentiation in the mathematical sense, as explained below.

The derivative of a function $f$, written as $f'(x)$ or $$\frac{df}{dx}$$

may be defined as $$f'(x) = \lim_{\delta \to 0} \frac{f(x+\delta) - f(x)}{\delta}. \quad (1)$$

The following example illustrates the basis for automatic differentiation as a solution technique, for one of ordinary skill in computer graphics programming. A more complete treatment may be found in the mathematics literature; e.g., *Automatic Differentiation of Algorithms: Theory, implementation, and Application*, SIAM, Philadelphia, Penn. 1991. Consider an example wherein $f'(x)=2x^2+1$. Set the variable $\delta=d$, wherein d is a small non-zero number, very similar in concept to an infinitesimal as first introduced by Newton and Leibniz. Then, an approximation to $f'(x)$ may be obtained by $$\frac{f(x+d) - f(x)}{d} = \frac{(4dx + 2d^2)}{d} = 4x + 2d. \quad (2)$$

Comparing this result with the exact derivative 4x, an additional error term 2d is evident, having the same order of magnitude as d. Note that the error term arises from the $2d^2$ term in the numerator. Thus, if d is chosen to be sufficiently close to zero and less than one, then $d^2 \ll d$ and is therefore much closer to zero. For example, if $d=10^{-3}$, then $d^2=10^{-6}$. Ultimately, if $d>0$ and $d^2=0$, then Equation (2) would yield an exact derivative, but there is no real number d with such properties. The number system can be extended, however, to include a "differential" d having the property $d>0$ and $d^2=0$, as introduced in a different context by Clifford in the year 1873. As with the imaginary number i, the differential d has some additional properties that may prove useful. For example, d is commutative, so that ad=da and a+d=d+a for any real number a. Using the differential d instead of the limit of δ, Equation 1 can be rewritten as $$f(x+d) = f(x) + df'(x). \quad (3)$$

The exact derivative may therefore be computed by computing $f(x+d)$, and reading the coefficient of d. For example, if $f(x)=x^n$, then $$f(x+d) = (x+d)^n = x^n + nx^{n-1}d + d^2\left[\frac{n(n-1)}{2}x^{n-1} + \ldots\right]. \quad (4)$$

All of the terms on the right hand side of the equation are equal to zero, except for the first two terms. The exact derivative is therefore the coefficient of d, which is $nx^{n-1}$, as expected.

The above automatic differentiation method may be generalized to partial derivatives. Instead of the differential d, a set of non-zero numbers $(d_0, d_1, \ldots d_i)$ with $i \in I$ an index set may be introduced. The set $(d_0, d_1, \ldots d_i)$ commutes with all real numbers, and has the additional property that $d_i d_j = 0$ for all $i, j \in I$. A general differential of this type may now be written as $$x = a + \sum_{i \in I} b_i d_i.$$

That is, members of this new differential class may be represented as a pair consisting of the real number a (the real part) and a vector of real numbers, $(b_i)_{i \in I}$ (the infinitesimal part). Extending Equation 3 to this new differential class, the partial derivatives of a multi-variable function $f(x_0, x_1, \ldots x_i)$ may be obtained by computing $f(x_0+d_0, x_1+d_1, \ldots x_i+d_i)$, and reading the desired $i^{th}$ partial derivative from the coefficient of $d_i$. For example, partial derivatives for a function $f(x, y)$ mapping a pair of real numbers to another real number may be computed by computing $f(x+d_0, y+d_1)$. The partial derivative with respect to x is read off of the coefficient of $d_0$, and the partial derivative with respect to y is read off of the coefficient of $d_1$. All $d_0 d_1$ terms are zero by definition. Note that this technique requires substantially fewer computations of the function $f(x, y)$ than finite difference methods.

II. Generic Programming

Suitable programming languages, such as C++, may be used to operate on differential types because of their potential for "generic programming." Generic programming refers the methodology by which software is written so as to be independent of the underlying data types used. For example, generic programming is adopted by the Standard Template Library, which employs the C++ template mechanism to define abstract data types and algorithms independently of the types of their contents and arguments. In fact, there are now a number of template-based mathematical libraries for C++ that are generic. One of the recognized purposes of generic programming is to enable code that is independent of information such as the machine representation of floating point numbers (for example, of whether the type "float" or "double" is used.)

Generically-programmed libraries may also be exploited to supply mathematical functions that will operate with a specially-defined object class for handling differentials. The specially-defined object class should be designed to export an interface similar enough to that of the more usual number types that it can replace them. The new class may be defined algebraically (e.g., through $d^2=0$), and therefore may be implemented similarly to object classes for complex numbers. Generally speaking, computing derivatives of a wide class of functions may thereby be accomplished as easily as computing those functions applied to complex numbers.

Illustrative examples in C++ are provided below. An underlying data type float may be used. The float type may be extended by adding in new elements implied by the differential d in a new Differential class. Every element of the Differential class can be written in the form a+bd, for real a and b. The variable a may be referred to as the real part and b as the infinitesimal part. As coded in C++, the Differential class may be defined as:

```
class Differential {
public:
    float a; // Real part
    float b; // Infinitesimal part
    Differential(float a0, float b0 = 0.0f) : a(a0), b(b0) { }
};
```

In the alternative to making members of the differential class public, an accessor method may be used.

Operations on objects of type Differential should be defined in a specific way. For example, the sum of two Differential objects $a_0+b_0d$ and $a_1+b_1d$ should be defined as $(a_0+b_0d)+(a_1+b_1d)=(a_0+a_1)+(b_0+b_1)d$. Similarly, the product of two differential objects should be defined as $(a_0+b_0d)(a_1+b_1d)=a_0a_1+(a_0b_1+a_1b_0)d$. In C++, operators may be specially defined for special object classes. This may sometimes be referred to as "operator overloading." The C++ examples below demonstrate operator overloading for addition and multiplication of Differential data types, respectively:

```
Differential
operator+(const Differential &x, const Differential &y) {
    return Differential(x·a+y·a,x·b+y·b);
}
Differential
operator*(const Differential &x, const Differential &y) {
    return Differential(x·a*y·a,x·a*y·b+x·b*y·a);
}
```

The operators may be used to compute derivatives. For example, consider the function $f(x)=(x+2)(x+1)$. This may be implemented in generic form as a polymorphic function:

```
template<class X> X f(X x) {
return (x+X(2))*(x+X(1));
}
```

Note that the constants in this expression have been cast to the "template" parameter type so that the arguments to the "+" operator are of the same type. An alternative is to overload the operators so that they can accept arguments of differing type. A differential variable d may now be defined by:

Differential d(0, 1);

d may then be used to compute the derivative of $f(x)$ at any desired value of x, by evaluating the function with d added to the argument. The derivative is the infinitesimal part of the returned value. For example, at x=3, the value of $f(X(3)+d)$ is $$(3+d+2)(3+d+1)=(5+d)(4+d)=20+9d, \quad (5)$$

since $d^2=0$ by definition. Thus, computing the function $f(X(3)+d)$ in generic form will return the differential object (20, 9); the exact derivative is given by its second term 9. It should be apparent that this is the correct result. Note that exactly the same result for x=3 may be obtained by defining Differential d (3,1);

and computing $f(d)$. In this case, the desired value of x is supplied as the real part of the differential.

The foregoing examples illustrate the use of overloaded addition and multiplication operators to compute a derivative using generic function, such as may be obtained from a template-based mathematical library Subtraction should be a straightforward variation of addition, but defining a suitable division operator for Differential objects may be a little more subtle. One approach may be to adopt a generalized binomial expansion of $(1+x)^{-1}$. For example:

$$\frac{a_0 + b_0 d}{a_1 + b_1 d} = \frac{a_0 + b_0 d}{a_2} * \frac{1}{1 + (b_1/a_1)d} \quad (6)$$

$$= \frac{a_0 + b_0 d}{a_1}(1 - (b_1/a_1)d + d^2( \ldots ))$$

$$= \frac{a_0}{a_1} + \frac{a_1 b_0 - a_0 b_1}{a_1^2} d$$

Thus, the ratio of two differential objects may be defined according to Equation 6. It should be apparent that this result requires that the real part $a_1$ of d in the denominator be non-zero, but this may easily be accomplished.

This implementation of automatic differentiation is not limited to functions that are restricted to the foregoing operators. Any differentiable function defined over the real numbers can be extended to the objects of the Differential class by $$f(a+bd)=f(a)+bf'(a)d. \quad (7)$$

For example, a cosine operation may be defined for Differential objects as follows:

```
Differential
cos(const Differential &x) {
return Differential(cos(x·a), -x·b*sin(x·a));
}
```

Thus, once a relatively small number of operations have been defined for Differential objects, virtually any differentiable function such as commonly used in computer graphics and other applications can be automatically differentiated. In combination with a suitably generic vector and matrix library, vector and matrix expressions can be differentiated, as well. Complex code such as used in fluid dynamics simulation can also be differentiated to determine, for example, how the output parameters depend on an input parameter. Aspects of automatic differentiation in a C++ environment are further described in "Function Minimization and Automatic Differentiation Using C++," Jerrell, M. E. in *Conference Proceedings on Object-Oriented Programming Systems, Languages, and Applications*, ACM Press, 1989, and by Claus Benson and Ole Stauning in "FADBAD, Flexible Automatic Differentiation Using Templates and Operator Overloading in ANSI C++," 2003, http://ww.imm.dtu.dk/fadbad.

For many applications, for example, bundle adjustment as further described herein, it may be desirable to compute a second derivative. As suggested by the FADBAD library, one approach is to simply iterate the computation of the derivative. For example, in the single variable case, a class of Differential objects may be defined over an arbitrary class:

```
template<class X>
class Differential {
public:
X a; // Real part
X b; // Infinitesimal part
Differential(X a0,X b0 = 0) : a(a0), b(b0) { }
static Differential<X> d( ) {
return Differential<X>(X(0),X(1));
}
};
```

This may be compared to the first example for defining a Differential class, which was defined over a class of float variables. We may now compute second derivatives by iterating the above method. For example, to compute the second derivative of a first function "$f$", a second C++ function "g" may be used to compute the derivative of $f$ in a generic manner. Then, g may be iterated on its result. The sample C++ code below should illustrate this method:

```
template<class X>
X f(X x) {
return ... // Compute some function of x
}
//
// Compute f'(x)
//
X g(X x) {
return f(Differential<X>(x)+Differential<X>::d( )).b;
}
//
// Compute f"(x)=g'(x)
//
... = g(Differential<float>(x)+Differential<float>::d( )).b;
```

Generic programming techniques may also suitable for use with interval arithmetic and affine arithmetic. By implementing these methods generically, interval arithmetic and affine arithmetic may also be combined with automatic differentiation for applications to inverse rendering problems, such as photogrammetry.

III. Applications to Photogrammetry, Match-Moving, and Other Digital Movie Applications Many applications in digital movie post-production may involve inverse rendering; that is, determining what input to a renderer will produce an output that matches a given image. For example, a number of parameters $(\theta_1, \theta_2, \ldots)$ may be provided as input to a 3D rendering process. These parameters may range from transformation parameters such as angle of rotation to shader parameters such as the exponent in a Blinn-Phong shader. In general, a rendering process may be considered to be a function $$f:(\theta_1, \theta_2, \ldots) \rightarrow (I_{i,j,c}), \tag{8}$$

where $(I_{i,j,c})$ represents the color of the "c" channel of the (i, j)-th pixel of the rendered image. If $J_{i,j,c}$ is some "correct" or desired result used as a baseline, then we can write a sum of squares error term $$e = \sum_{i,j,c} (I_{i,j,c} - J_{i,j,c})^2. \tag{9}$$

If the rendering code is written generically enough that some parameters may be replaced by Differential objects, then e and its derivative may be automatically computed with respect to those parameters, as described above. The automatic differentiation tool may be applied in the context of a minimization algorithm, such as non-linear conjugate gradients, to efficiently derive input parameters that result in an image I that best matches J.

Many problems in post-production can be solved by differentiating or inverting a subsystem of a 3D renderer. For example, part of a ray-tracer takes as input a parameters of a light ray, and returns as output texture coordinates that the ray intersects. By implementing this ray-tracing code generically, we can automatically compute the derivative of the texture coordinates as a function of the light ray parameters. This may be useful, for example, in performing anti-alias texture mapping.

Another inverse rendering problem concerns transforming and projecting 3D points to 2D screen coordinates. The inverse of this operation may comprise deriving a 3D modeled geometry that best fits a collection of projected 2D points; i.e., photogrammetry and match-moving.

Figures 1, 3:
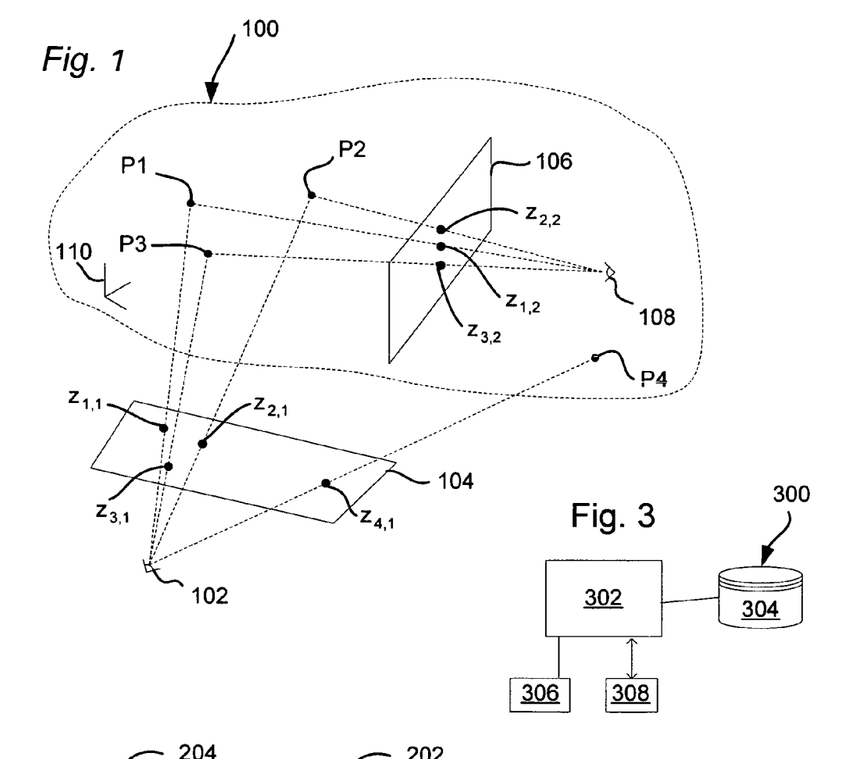
FIG. 1 is a diagram showing a three-dimensional scene to be reconstructed using a reverse-rendering method.
FIG. 3 is a block diagram showing an exemplary system for carrying out steps of the invention.

Referring to FIG. 1, it may be desired to reconstruct a set of 3-dimensional points $P_i, i \in I$ (for example, P1, P2, P3 and P4), with coordinates $(p_i)$, representing a three-dimensional scene 100. The coordinates $(p_i)$ may be defined with respect to a suitable datum 110 for a coordinate system referenced to scene 100. A set of images exists indexed by the set J, in which some of the $P_i$ appear projected. For each image j a camera projection function $c_j$ exists, such that $c_j(p_i)$ is the projection of the point $P_i$ into a 2-dimensional screen space associated with camera j. For example, a screen space 104 may be associated with camera 102, and screen space 106 with camera 108. Selected cameras, for example, camera 108, may be freely posed within scene 100. In the general case, a screen space associated with a camera need not encompass all points of interest within a scene. For example, screen space 106 does not encompass P4, which, however, is encompassed by screen space 104. Note that the projection function comprises a type of reverse-rendering function. Methods for defining a suitable projection function $c_j$ are well understood in the art of photogrammetry, and need not be described herein.

An index set R may be defined such that $(i,j) \in R$ for each $p_i$ that appears projected in an image j. For each $(i,j) \in R$, a 2D position $z_{i,j}$ in an associated screen space may be measured from a corresponding image. For example, 2D positions for $z_{1,1}$ to $z_{4,1}$ may be measured in an image from camera 102. Likewise, positions for $Z_{1,2}$ to $Z_{3,2}$ may be measured in an image from camera 108.

Because the positions of interest (e.g., the coordinates of P1–P4 with respect to datum 110) and the projection function $c_j$ are at least partially undefined, the position $z_{i,j}$ is related to the projected position $c_j(p_i)$ by varying amount of error $e_{i,j}$. In other words, $$e_{i,j} = z_{i,j} - c_j(p_i), \tag{10}$$

where $e_{i,j}$ is the difference between actual and measured projections of $P_i$. The error $e_{i,j}$ varies as a function of $c_j$ and $(p_i)$, and the measured 2D positions $z_{i,j}$ are generally fixed.

The amount of error may be defined over 2D coordinates x, y in the relevant screen space. Suppose that the x and y coordinates of $e_{i,j}$ are independent normally distributed variables whose components have variance $\sigma_j$. The positions $(p_i)$ of the points $P_i$ and any unknown parameters of $c_j$, such that the deviation of the $e_{i,j}$ is minimized in the least squares sense, may therefore be determined. The maximum likelihood estimation for the positions $(p_i)$ and unknown parameters of $c_j$ may be determined from the minimum error e, wherein e is defined by $$e = \sum_{(i,j) \in R} e_{i,j}^2 = \sum_{(i,j) \in R} (c_j(p_i) - z_{i,j})^2 / \sigma_i^2. \tag{11}$$

It should be apparent that the minimum error may be determined from Equation 11 by finding its derivative and solving for those values of $(p_i)$ at which the derivative is zero. One of ordinary skill may employ a different function for expressing the error, as known in the art. If desired, the derivative can be used to minimize the error function using an iterative minimization algorithm, as known in the art, and sometimes referred to as bundle adjustment. As should be apparent, the solution process may be greatly facilitated by expressing Equation 11 using generic programming techniques as disclosed herein, and solving for the derivative by automatic differentiation. Of course, various choices for a solution process may present themselves during the design of a photogrammetry application implementing the invention, and exemplary details are provided below.

But before discussing the solution process in greater detail, certain other general observations should be made. In practice, further information about the structure of $P_i$ is often available. For example, it may be known that certain ones of $P_i$ are coplanar. Such information may be used to further constrain the solution. At the same time, at least some parameters of the projection function $c_j$ may be unknown. For example, the cameras may have unknown focal length and lens distortion, or may be located at an unknown position or orientation. Unknown parameters may be represented as variables in the projection function. Advantageously, when a generic programming/automatic differentiation approach is adopted, a great deal of flexibility may be accommodated in the definition and constraint of the solution. For example, a user interface may be provided for a user to define parameters of the solution using flexibly-defined relational expressions. These relations may be incorporated into the solution and differentiated automatically, without requiring manual differentiation.

Figure 2:
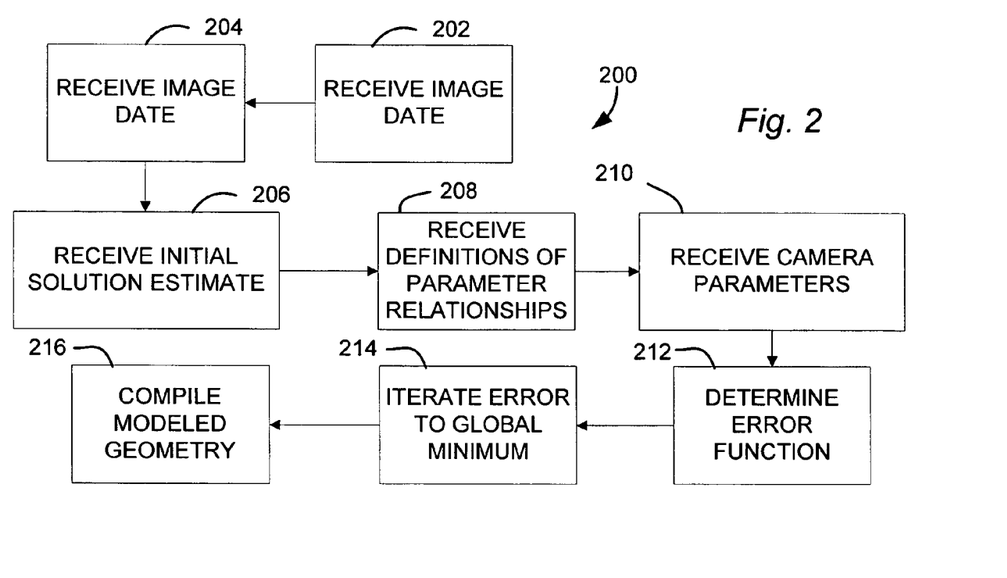
FIG. 2 is a flow chart showing exemplary steps of a reverse-rendering method according to an embodiment of the invention.

The foregoing general principles may be implemented in various ways in a solution process. Referring to FIG. 2, according to an embodiment of the invention, one such solution method 200 may be summarized as follows. At step 202, image data representing a plurality of images of a scene are received into a solution process. For example, a user interface may be provided for a user to identify and select pertinent images from a database, and then initiate a solution process using the selected images. Images of the scene may be collected using any suitable camera, as known in the art.

At step 204, user input designating corresponding points or other corresponding features appearing in two or more of the selected images is received. The user input serves to mark and identifies corresponding features appearing in more than one image. Each corresponding feature should be located on a node of the scene graph. For example, while displaying multiple images on a computer display, a user may indicate corresponding points on the images using a pointing device. Any suitable method may be used to receive user input indication a plurality of corresponding features in the image data. Methods for entering and recording such measurements are known in the art.

At step 206, a preliminary solution estimate for the scene is received for use in the solution process. The preliminary solution estimate may be developed by a user, based on any desired available information or estimate. One convenient approach may be accept a preliminary 3D model as the solution estimate, preferably in scene graph form. Many users may be familiar with 3D modeling software, and may build an approximation to the scene using any suitable modeling program. For example, in an embodiment of the invention, a solution algorithm was designed to accept an approximate model, in scene graph form, constructed using AliasjWavefront Maya™ as input. In the alternative, an initial solution estimate may be developed automatically, or adopted from an arbitrary set of values. Points in the scene graph or other solution estimate should be related to measurements of 2D position, e.g., $z_{i,j}$, in the image data, based on the user input from step 204.

Representing the scene being reconstructed as a DAG, for example, a scene graph, achieved more accurate results from far smaller sets of input images than prior-art methods that do not make use of scene graphs. Scene graph hierarchies, for example, as described in Chapter 7 of "Object Hierarchy and Simple PHIGS (SPHIGS)" in "Computer Graphics, Principles and Practice in C" by Foley et al., Addison-Wesley, 1995, ISBN 0-201-84840-6, are well known in the art of computer graphics. The use of scene graphs is well-supported by standards for computer graphics. In many computer graphics applications, every discrete set of related graphics data (called "the scene") is represented in a corresponding scene graph.

Each object in the scene graph stands in a hierarchical relationship to the other objects in a scene. More precisely, a scene graph is a type of directed, acyclic graph, meaning that it is a one-way tree structure without looping, like a family tree. For example, a "parent" and/or "children" are identified for each object or node. A parent may have multiple children, and a child may have multiple parents. A child is not permitted to be a parent to any node in its parental lineage. Elements that have a data component, like viewable objects or camera locations, are represented at the nodes. Each node represents a function that will return a value depending on input parameters including space and time.

An important aspect of scene graphs is the defined relationship between hierarchically-related objects, sometimes referred to as a "transform." In particular, the relative orientation, size, mode of attachment, or other relationship of a child object with respect to its parent is the transform of the child object. An object's transform can be manipulated to adjust the relationships between the parent and the child objects. For example, to adjust the size of a hand (child) relative to an arm (parent), a size parameter of the hand transform may be increased. Transforms are inherited, in that the transform of an object is inherited by its children. For example, when the transform for the arm is adjusted to make the arm twice as large, then the hand grows twice as large, too. The entire collection of objects, parent-child relationships and transforms comprises the scene graph. So long as any desired transforms are expressed as differentiable functions, they may readily be incorporated into an expression for e and differentiated.

Scene graphs are useful for modeling movement and scaling of objects. When an object is moved, grows in size, or shrinks, normally all of the child objects move, grow, or shrink along with it. A computer-generated actor may provide a simple example. When the actor's arm is moved, its attached hand normally moves along with it. In terms of the scene graph, the hand is defined as a child of the arm. Advantageously, when the actor's arm is moved, the animator doesn't need to animate the hand separately. The relationship defined in the scene graph ensures that the hand moves along with the arm. Static objects may also be included in a scene graph. An example of a static object is a building with windows. If the building itself is the parent of the windows, then when the building is relocated during the photogrammetry method, the windows will automatically move with it. Additionally, if the size or proportion of the building is changed, the windows will also scale with it. The relative orientation, size, mode of attachment, or other relationship of a child object with respect to its parent may be referred to as the transform of the child object.

Any suitable software application, for example, Open Inventor™ or Maya™, may be used to build a scene graph for use with a method according to the invention. Initially (prior to the application of photogrammetry), the scene graph contains partial and/or approximate information. For example, windows may be related as child objects to a building whose size and position is not yet known. In such case, a transform for each window may be configured to contain partial information about its relative size and orientation. For example, it may be specified that the window has rectangular edges, lies flat in a wall of the building, and is oriented parallel to the edges of the wall, without specifying the dimensions of the window. Any parameter of the transform that is incomplete or incorrect is automatically computed using photogrammetry techniques. Complete information about the scene is not required, because the information in the initial scene graph guides the photogrammetry solution, but does not determine it.

The 3D model, preferably in scene graph form, may be accepted as the initial solution estimate. In addition, at step 208, relationships in the preliminary solution estimate may be further defined from user input. For example, in an embodiment of the invention, users may define transformations in a Maya™ scene graph to represent partially known information in the scene. For example, if an object in the scene is known to be a rectangular solid, but has unknown dimensions, then users may instantiate a "cube" object in the scene graph and scale it using a transform. The user may then mark variables in the scene graph whose values are unknown. In the rectangular solid example, a user may mark three numbers defining the unknown dimensions of the solid. There may be various unknown parameters marked as unknown in a scene: scalings, rotation angles, translations, camera focal lengths and so on.

In addition, the photogrammetry projection function should be defined to include information or assumptions regarding camera parameters, including but not limited to camera position, camera orientation, focal length, lens and/or focal plane distortion, and other factors that affect the appearance of the image. At step 210, such of these parameters as are known may be received for use in the solution process. As previously mentioned, at least some projection function parameters may be marked as unknown, and solved for. For example, the camera pose may be unknown, particularly if the images represent a time sequence during which the camera moved, or if the pose was not measured for any other reason. Other camera parameters are often known, for example, focal length. Relationships may be defined between camera parameters. For example, the focal length of two or more camera may be equated. All of these camera parameters may be represented as nodes in the initial scene graph. Advantageously, this may facilitate solving for unknown camera parameters in the same way—i.e., using the same homogenous set of equations—as the geometry of the scene. This may greatly enhance the power and flexibility of a method according to the invention, compared to prior art methods in which camera parameters are handled separately. For example, camera pose at any given time may be treated just like any other unknown parameter for solution, enabling cameras to be freely posed inside or outside of the scene.

At step 212, an error function e for calculating a solution is determined. The solution may comprise the desired positions ($p_i$) and unknown parameters of the projection function, for example, any unknown camera parameters. The error function e is defined such that it is differentiable, and represents a difference (for example, a least-squares difference as generally express in Equation 11) between predicted and measured values of the projected points $z_{i,j}$. It should be apparent that e should generally comprise a system of equations that may be expressed in matrix form.

In an embodiment of the invention, an error function may be defined using an rendering subsystem of an existing rendering and modeling program. The rendering subsystem may be modified to compute the projections of points in this scene hierarchy (i.e., to perform reverse rendering) in a generic way. Preferably, the existing rendering subsystem utilizes scene graphs, including transforms and camera parameters, so the resulting generically-programmed projection function $c_j$ may readily accept input and provide output using a standard scene graph format.

At step 214, the error function e may be iterated so as to discover the collection of unknown parameters, e.g., the unknown marked parameters and the points ($p_i$) of the scene geometry, that minimizes its value. The value of these parameters at the global minimum of e may be regarded as the solution for the originally-defined reverse-rendering problem. The iteration may begin with a solution estimate comprising the information received at steps 206–210. Minimization may be performed using an iterative minimization algorithm. As further described below, it should be advantageous to include a full computation of the exact second derivative (Hessian), using an automatic differentiation method disclosed herein, to guide the iterative solution process to a more rapid solution, according to Newton's method.

In particular, an active set variation of the Levenberg-Marquardt algorithm, suitable for bounded and unbounded minimization, may be used for bundle adjustment. However, instead of approximating the Hessian (the matrix of second derivatives) of e as a function of the Jacobian (as some have done in the past), the full exact Hessian and Jacobian may be calculated using automatic differentiation as disclosed herein. At each iteration, a conjugate gradient algorithm may be used to solve the linear system in the Hessian.

At step 216, the parameter values corresponding to the global minimum of e may be used to build a model of the three-dimensional scene. For example, solved parameters may be incorporated into the preliminary estimate scene graph as a parameter of an existing or newly-added node, to complete the solution. Finally, the reconstructed scene may be presented to the user. If the reconstruction contains substantial errors, the user may be given the opportunity to make adjustments to the rough model and run the process again. If the result is substantially correct, it may be readily detailed by a graphics artist, advantageously already being in a standard scene graph format.

Referring again to solution step 214, it should be apparent that the solution should be generalized to include partial differentiation, because e in general depends on more than unknown parameter. It may be advantageous to represent the vector $(b_i)_{i \in I}$ (the infinitesimal part of the partial differential object employed in automatic differentiation) sparsely as index-value pairs rather than as a dense list of values. This permits sparse representation of the Hessian, and use of a sparse conjugate gradient method to solve for the iteration step. Exploiting sparsity may prove very helpful for obtaining good performance. Consider computing $N^2$ second derivatives, with respect to $(x_1, \ldots, x_N)$, of $$f = \sum_{i=1}^{L} f_i^2, \tag{12}$$

where each $f_i$ is a function of some lesser number M of the $x_i$. It follows that the Hessian has no more than $LM^2$ non-zero terms. For match-moving problems, the number of non-zero terms is usually much less than $N^2$.

In an embodiment of the invention that was used for post-production work on a motion picture, a form of automatic differentiation known as forward mode differentiation was implemented. An alternative approach to automatic differentiation is reverse mode automatic differentiation, which is described in the mathematics and computer science art. Reverse mode differentiation may often be better suited to problems involving large numbers of input variables. However, in an embodiment of the invention, reverse mode differentiation was implemented, but the performance realized was inferior to that achieved in embodiments that implemented forward mode differentiation with sparse representation of the differentials. It may also be possible to implement the invention using a sparse variation of reverse mode differentiation, which is at yet untested for this application.

Method 200 readily encompasses the solution of complex match-moving problems. For example, sequences of live action images may be treated as sets of independent images, to permit simultaneous solution of both static and time-dependent parameters. In fact, instead of computing match-moves from frame to frame incrementally, as traditionally done, match-moves may be computed by minimizing over all frames simultaneously. To the extent that the input images represent a sequence over time, then the user may indicate whether or not a parameter is to be considered animated. Those parameters designated as animated (changing as a function of time) may be handled at each time step as an independent parameter for solution. In practice, applying an embodiment of the invention over multiple frames in a sequence often resulted in successful Levenberg-Marquardt minimizations in spaces of dimension greater than 10,000, demonstrating a significant advance in the art.

Advances over the prior art have been demonstrated in other ways, as well. The invention provides a high degree of flexibility to describe known information about a scene that the invention affords to users. In an embodiment of the invention, any transformation parameters such as rotation angles or relative scale could be marked for solving. An arbitrary number of cameras could be placed anywhere in the scene hierarchy, and parameters for camera transforms could be marked for solving. The solution method proved able to reconstruct animated articulated geometry, and even to reconstruct cameras mounted on articulated geometry (as with real camera rigs). Such cameras may be handled like any other animated parameter.

Additionally, some 3D modeling applications, for example, Maya™, support the connection of parameters in a scene graph using symbolic expressions. Such applications may be used to build input for the solution step. In an embodiment of the invention, an expression evaluator similar to that provided in Maya™ was written in C++, in a generic and thus differentiable manner. Expressions representing relationships between parameters of a scene were allowed to enter into the expression for e. By defining such expressions, users may be able to express constraints that that may be difficult to express using transforms. For example, users may be able to specify that two independent objects were of the same unknown height, or that two cameras have the same unknown focal length.

It should be apparent that the foregoing capabilities tend to greatly increase the complexity of the expression for e. Despite this additional complexity, an embodiment of the invention proved capable, in an intensely demanding environment for a feature film production, of reliably, accurately, and swiftly identifying global minima for e. This too demonstrates the practical and proven advantages of the invention.

In general, the invention has proved to be a highly efficient method for computing derivatives used for solving reverse-rendering problem. In particular the invention has provided an efficient solution to the problems of reconstruction of geometry and camera moves from film. As implemented in a production environment, the invention has proven capable of solving for both structured and unstructured geometry. An application embodying the invention has been found suitable for completely replacing prior-art commercial match-moving and photogrammetry software for time-sensitive and major visual effects projects for motion pictures.

The effectiveness of the invention as implemented for motion picture post-production rested in no small part on a consistently generic implementation of the expression for e. Once reusable library components were written for defining e in a flexible and generic manner, then finding the solution for e was no more difficult to implement than the forward code that simply transforms and projects points. The solver consisted almost entirely of generic code to compute e, and library code to optimize generic functions.

What is more, the invention, and in particular, efficient automatic differentiation in a generic programming environment, enabled a solution using the full Newton method instead of the commonly-used Gauss-Newton approximation. The full Newton method yields an accurate solution very quickly, but is often considered too complex for practical consideration. The application of automatic differentiation in the generically-programmed environment removed these formerly formidable limitations. However, the Gauss-Newton method may also be implemented, and may be preferable for some applications. Comparison between the two methods is a complex topic, and either method may be adopted, depending on the circumstances.

Although there is no recognized standard set of benchmarks for comparing photogrammetry and match-moving applications, the invention as implemented for motion picture post-production is believed to be far more efficient than comparable prior-art applications. In a production environment, 3D models of scenes may be built incrementally (such as by using a commercially available modeler), and then the photogrammetry/match-moving solver may be applied to find the best local minimum using the most current information. When implemented in this fashion, with solution processing performed on a single 2:8 GHz Xeon™ CPU, the time required to reach a solution was generally an insignificant part of the workflow. Usually, a scene is constructed in an incremental manner, with additional approximations for scene elements after interim solution processing. Such incremental changes can be solved very quickly indeed.

Even batch solutions for an entire scene at once can be performed quickly. For example, in a scenario such as solving for a six-hundred frame match-move, determining six camera transform parameters for each frame as well as approximately one-hundred parameters that do not vary in time (requiring minimization in a thirty-seven hundred dimensional space), the resulting error function might require as little as about five minutes, or at most about forty-five minutes, to solve. Significant further reductions in processing time may be realized by using selected frames (for example, every tenth frame) to obtain a good approximation that may be used to initiate a full solve. In comparison, prior-art commercial match-moving tools do not use all frames simultaneously, but instead solve one frame at a time, or solve using a small batch at a time. Thus, prior-art match-moving tools would require considerably longer to solve a large number or frames. But when using the implementation according to the invention in this way, the time to solve was often significantly less than the time to communicate the results back to the 3D modeler.

When working with such characteristically large solution spaces, often having a dimensionality running into the thousands, and that may have a complex topology due to the presence of parameters such as rotation angles, one might expect many local minima to be encountered, which might impede discovering the global minimum. But surprisingly, when the invention was implemented for real photogrammetry and match-moving problems that appeared during motion picture post-production activities, it was usually possible to start the Levenberg-Marquardt algorithm and arrive directly at the unique global minimum. In rare cases, a local minimum was discovered that was not the global minimum. Such local minima were often related to the global minimum by a simple symmetry operation. For example, a local minimum might be discovered having an object that was inverted with respect to the axis pointing directly forward from the camera in which it was projected. In these cases it was an easy process to correct the inversion and then repeat the solution algorithm with the corrected scene graph as the initial solution estimate.

Part of the effectiveness of the invention in directly reaching the global minimum is believed to result from the implementation of the full Newton method, including computation of the exact Hessian. This, in turn, was enabled by the efficiency and ease with which the differentials could be computed during each iteration using the generic programming and automatic differentiation methods described above. This was useful in ensuring that the algorithm never left the "basin" around the global minimum to become lost in the solution space, and made it less likely for the algorithm to become trapped in a local minimum.

According to the foregoing, therefore, one of ordinary skill may construct a system for performing a method according to the invention. FIG. 3 shows one such system 300, comprising a computer 302 connected to receive image data from a database 304. System 300 may further comprise a memory 306 operably associated with the computer. Memory 306 may contain coded instructions to enable one of ordinary skill to carry out a method according to the invention. For example, memory 306 may comprise instructions for performing steps of a method according to the invention. For example:

(i) receiving image data comprising a plurality of photographic images of a three-dimensional scene.

(ii) receiving user input indicating a plurality of corresponding features each appearing in at least two of the plurality of photographic images.

(iii) determining an error function for a reverse-rendering function, the reverse-rendering function defining a relationship between three-dimensional coordinates in the three-dimensional scene and corresponding two-dimensional coordinates of the plurality of corresponding features.

(iv) minimizing the error function to determine a solution corresponding to a global minimum of the error function, comprising calculating at least first derivatives of the error function using automatic differentiation, thereby computing intermediate solution estimates for successive iterations of the error function, until the solution estimates converge to the solution.

Instructions for any other desired step of a method according to the invention for performance by computer 302 may also be held in memory 306. Any of the foregoing instructions may also be encoded on a removable media 308, for reading by computer 302 or another computer. Suitable computer systems for carrying out the invention are known in the art, and any suitable system may be used.

Having thus described the improved photogrammetry method, it should be apparent to those skilled in the art that certain advantages of the within system have been achieved. It should also be appreciated that various modifications, adaptations, and alternative embodiments thereof may be made within the scope and spirit of the present invention, as discussed above. For example, while a specific application to photogrammetry and match-moving has been disclosed, it should be apparent that the invention is not limited thereby. The invention is defined by the appended claims.

What is claimed is:

1. A computer-implemented method for determining parameters of a three-dimensional scene using a reverse-rendering function, the method comprising:

receiving image data comprising a plurality of photographic images of a three-dimensional scene;

receiving a first directed acyclic graph of the scene, the first directed acyclic graph defining transforms between hierarchically-related nodes of the graph;

receiving user input indicating a plurality of corresponding features each appearing in at least two of the plurality of photographic images and associated with a node of the first directed acylic graph;

determining an error function for a reverse-rendering function, the reverse-rendering function defining a relationship consistent with the first directed acylic graph between three-dimensional coordinates in the three-dimensional scene and corresponding two-dimensional coordinates of the plurality of corresponding features; and minimizing the error function to determine a solution corresponding to a global minimum of the error function, comprising calculating at least first derivatives of the error function using automatic differentiation, thereby computing intermediate solution estimates for successive iterations of the error function, until the solution estimates converge to the solution.

2. The method of claim 1, wherein the determining step further comprises determining the error function comprising reverse-rendering parameters selected from group consisting of camera position, camera orientation, focal length, aperture size, lens distortion, and distortion of focal plane.

3. The method of claim 1, wherein the determining step further comprises determining the error function comprising reverse-rendering parameters including at least one camera position located within the three-dimensional scene.

4. The method of claim 1, wherein the minimizing step further comprises calculating an exact Hessian of the error function.

5. The method of claim 1, further comprising initializing at least selected three-dimensional coordinates of the plurality of corresponding features and camera parameters for the plurality of photographic images as an initial solution estimate.

6. The method of claim 1, further comprising defining a second directed acyclic graph, consistent with the solution.

7. The method of claim 1, wherein the determining step further comprises determining the error function further defined by a user-selected differentiable relationship between user-selected parameters of the reverse-rendering function.

8. The method of claim 1, wherein the determining step further comprises determining the error function further defined by animation parameters to solve match-moving relationships between frames of a motion picture sequence.

9. The method of claim 1, wherein the receiving step further comprises receiving the plurality of photographic images representing a time sequence, wherein the determining step further comprises determining the error function further defined by time parameters for solving match-moving relationships between frames of a motion picture sequence, and wherein the minimizing step further comprises minimizing the error function simultaneously over the frames.

10. The method of claim 1, wherein the receiving image data step comprises receiving the photographic images comprising digital images from a digital camera.

11. A system for defining a digital model of a three-dimensional scene using photogrammetry, the system comprising:
a computer having a memory, the memory holding program instructions comprising:
receiving image data comprising a plurality of photographic images of a three-dimensional scene;
receiving a first directed acyclic graph of the scene, the first directed acyclic graph defining transforms between hierarchically-related nodes of the graph;
receiving user input indicating a plurality of corresponding features each appearing in at least two of the plurality of photographic images and associated with a node of the first directed acylic graph;
determining an error function for a reverse-rendering function, the reverse-rendering function defining a relationship consistent with the first directed acylic graph between three-dimensional coordinates in the three-dimensional scene and corresponding two-dimensional coordinates of the plurality of corresponding features; and
minimizing the error function to determine a solution corresponding to a global minimum of the error function, comprising calculating at least first derivatives of the error function using automatic differentiation, thereby computing intermediate solution estimates for successive iterations of the error function, until the solution estimates converge to the solution.

12. The system of claim 11, wherein the program instructions further comprise receiving an initial scene graph comprising at least a portion of an initial solution estimate.

13. The system of claim 11, wherein the program instructions further comprise instructions for determining the error function further defined by a user-selected differentiable relationship between user-selected ones of the parameters.

14. The system of claim 11, wherein the program instructions further comprise instructions for determining the error function further defined by animation parameters to solve match-moving relationships between frames of a motion picture sequence.

15. The system of claim 12, wherein the program instructions further comprise instructions for minimizing the error function by calculating an Hessian matrix using automatic differentiation, thereby guiding the iteration step according to Newton's method.

16. The system of claim 12, wherein the program instructions further comprise instructions for receiving the plurality of photographic images representing a time sequence, wherein the determining step further comprises determining the error function further defined by time parameters for solving match-moving relationships between frames of a motion picture sequence, and wherein the minimizing step further comprises minimizing the error function simultaneously over the frames.

17. The system of claim 11, wherein the program instructions further comprise instructions for receiving the image data comprising at least one image from a camera at an unknown location inside the three-dimensional scene.

* * * * *